United States Patent [19]

Hu

[11] Patent Number: 5,029,563
[45] Date of Patent: Jul. 9, 1991

[54] COMBUSTION CHAMBER ASSEMBLY OF DIRECT INJECTION DIESEL ENGINES

[76] Inventor: Guodong Hu, 102 Xinhua Street, Dalian, China

[21] Appl. No.: 575,019

[22] Filed: Aug. 30, 1990

[30] Foreign Application Priority Data

Feb. 8, 1988 [CN] China .................... 88100693.9

[51] Int. Cl.⁵ .................... F02B 23/04; F02B 23/06
[52] U.S. Cl. .................... 123/262; 123/276; 123/279
[58] Field of Search ........... 123/262, 263, 276, 279, 123/280, 661

[56] References Cited

U.S. PATENT DOCUMENTS

| | | | |
|---|---|---|---|
| 1,694,269 | 12/1928 | Lang | 123/276 X |
| 1,708,056 | 4/1929 | French | 123/276 |
| 2,505,999 | 5/1950 | Smith | 123/279 X |
| 3,253,584 | 5/1966 | Traub et al. | 123/276 X |

FOREIGN PATENT DOCUMENTS

| | | | |
|---|---|---|---|
| 126026 | 7/1984 | Japan | 123/279 |
| 547536 | 5/1977 | U.S.S.R. | 123/276 |

OTHER PUBLICATIONS

Hu, Guodong, *Marine Energy Saving*, published in Jan. of 1989, pp. 15–22.
Hu, Guodong, *SEA Technical Paper Series*, "New Strategy on Diesel Combustion Development", Feb. 26, 1990, Dalian University of Technology, pp. 1–5.

Primary Examiner—Tony M. Argenbright
Attorney, Agent, or Firm—Longacre & White

[57] ABSTRACT

Combustion chamber assembly of direct injection diesel engine comprising a cylinder head, a cylinder liner, an injection nozzle and a piston with a combustion chamber on its top. An air flow guide ring is provided in the combustion chamber assembly. The guide ring is arranged under and adjacent to the bottom surface of the cylinder and around the nozzle. The front end of the nozzle protrudes from the bottom of the guide ring. The peripheral surface of the guide ring acts as an air flow guide surface to lead the air squish. The air flow guide surface inclines in relation to the bottom surface of the cylinder head and its inclination angle is in the range of 30–70 degrees.

6 Claims, 1 Drawing Sheet

COMBUSTION CHAMBER ASSEMBLY OF DIRECT INJECTION DIESEL ENGINES

BACKGROUND OF THE INVENTION

The present invention relates to improvements on a combustion chamber of D.I. (direct injection) diesel engine.

In the combustion chamber of D.I. diesel engines known heretofore, when the piston goes upward, the ring-formed air on the top of the piston is compressed, forming a curent flowing toward the center of the cylinder. As a result of the surrounding air all flowing toward the center of the cylinder, impingement between the air currents is produced, which causes air flow loss and turbulance, gives resistance to the smoothly injected fuel spray from nozzle, and influences the mixing of the air and fuel. As for the multiple hole spray, the said air movement effect is not too much since the penetration force of each fuel spray is very strong. But as for the conical spray, the above effect is rather strong since the conical spray particles are very small. All the effect of such air movement discussed above produces a problem that the air and fuel could not mix each other perfectly.

SUMMARY OF THE INVENTION

An object of the present invention is to provide a novel combustion chamber assembly of D.I. diesel engine which overcomes the above mentioned drawbacks.

This object has been accomplished according to the present invention, by providing a combustion chamber assembly of D.I. diesel engine comprising a cylinder head, a cylinder liner, an injection nozzle and a piston having a combustion chamber on its top, wherein an air flow guide ring is provided in the combustion chamber assembly, the air flow guide ring is arranged under and adjacent to the bottom surface of the cylinder head, and around the injection nozzle; the frond end of the nozzle protrudes from the bottom surface of the guide ring; the peripheral surface of the guide ring acts as an air flow guide surface to lead the air squash, and the air flow guide surface inclines in relation to the bottom surface of the cylinder head and its inclination angle $\alpha$ is in the range of 30-70 degrees.

Preferably, the inclination angle $\alpha$ is in the range of 40-60 degrees.

By use of such an air flow guide ring, it will keep the inward air flow with ring form to the cylinder axis from interference among itself and guide the air movement in a certain direction below the bottom surface of cylinder head. Due to air flow velocity on the path of flow, there is a lower air pressure region established than that at the axis of cylinder, it induces the air flow at the center of the cylinder toward the outskirt and as a result, it helps the fuel injected from nozzle to flow outward freely and creates a condition for fuel spray to mix with rich air at outskirt freely in order to improve combustion performance and to reduce fuel consumption, smoke, exhaust temperature and maximum combustion pressure as well.

DETAILED DESCRIPTION OF THE INVENTION

Figure 1:
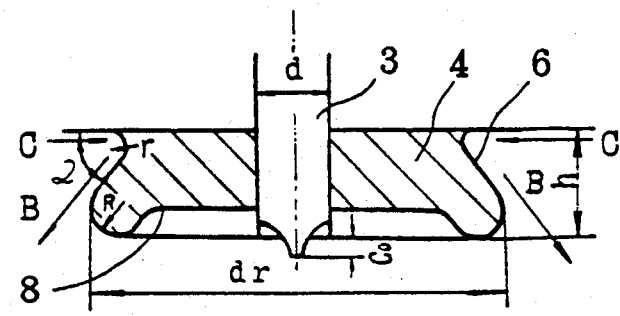
FIG. 1 is a schematic sectional view of air flow guide ring of the invention with nozzle locateed in its central hole vertically.

Referring to the drawings, the combustion chamber assembly (see FIG. 4) comprises a cylinder head 1, a cylinder liner 7, an injection nozzle 3, and a piston 2. At the top of the piston 2, there is a combustion chamber 5 which meets the combustion requirement. In a preferred embodiment, an air flow guide ring 4 is provided inside the combustion chamber assembly and fixedly attached to the bottom of the cylinder head 1.

Figure 2:
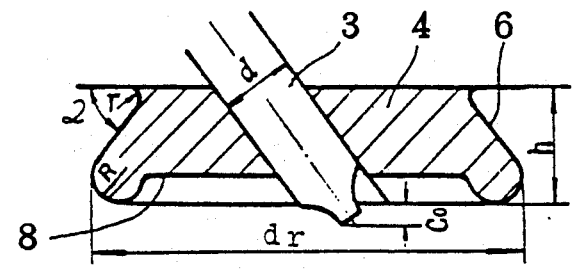
FIG. 2 is a schematic sectional view of air flow guide ring of the invention with nozzle located in its central hole with an angle.

The air flow guide ring shown in FIG. 1 and FIG. 2 is adapted for four stroke diesel engine or two stroke uniflow scavengine diesel engine with nozzle in the center of the cylinder head. In the case of FIG. 1, the nozzle is located vertically and the nozzle in FIG. 2 is arranged with an inclination angle.

The air flow guide ring has a central hole, the diameter of which is slightly larger than that of nozzle (approximately with an amount of 0.05-0.1 mm). The nozzle front end passes through the central hole of air flow guide ring and protrudes with a protrusion distance $C_o$ from the bottom surface of ring ($c_o = 0.5$-$1.0$ mm).

Figure 3:
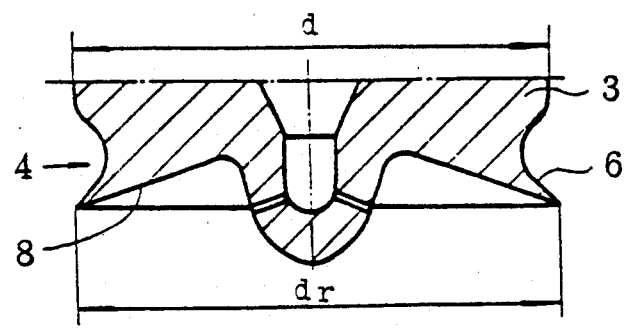
FIG. 3 is exaggerated sectional view of the air flow guide ring in another embodiment of the invention.

The peripheral surface 6 of air flow guide ring 4 acts as air flow guide surface, which is arranged to have an inclination angle $\alpha$, that means, the surface 6 relative to cylinder head 1 forming an inclination outward. The angle of inclination is best to keep 40-60 degrees. In the case of cylinder diameter less than 150 mm of the four stroke diesel engines, the air flow guide ring used is $d_r = 16$-$22$ mm, and thickness $h = 3$-$3.5$ mm (shown in FIGS. 1 and 2). Besides, at the outside lower and upper corner of air flow guide ring, it keeps a small round corner. The radius of upper round corner is $r = 0.5$ mm and that of lower round corner is $r = 1$ mm. The bottom surface of the guide ring may be a plane, but preferably, a recess 8 (as shown in FIG. 1, FIG. 2 and FIG. 3) is provided to it.

In operation, when the piston 2 in the cylinder goes up and reaches TDC during enging working, the air with ring form on the top of piston is compressed and it produces a kind of air movement C (called air squish) toward cylinder axis.

At the moment of C impinging to the inclined guide surface 6, the direction of movement starts to change from C to B, that is, under the guidance of air flow guide ring, the air flow subjected to the effect of inclined surface of air flow guide ring runs out downward and outward in all directions.

It thus indicates that the fuel spray injected from the central part of cylinder will not be affected by the air flow toward the cylinder axis. In the same time, on account of that there exits a certain velocity along the direction of guided air movement, it produces a lower pressure region with pressure lower than that at the central part of cylinder. The fuel spray at the central part is attracted by the air flow at lower pressure region to start moving outside. When this fuel spray comes out from the ring inside and meets with the air flow, it makes the fuel particles move toward out-skirt with air flow and a perfect air-fuel mixture will be formed.

FIG. 3 shows another embodiment of the air flow guide ring of the combustion chamber assembly according to the present invention. In this embodiment, the air flow guide ring 4 is integral with the injection nozzle 3, namely, the air flow guide surface 6 is directly formed on the peripheral surface of the front portion of the nozzle 3. The diameter ($d_r$) of the guide ring 4 is same as the diameter (d) of the injection nozzle 3. This embodiment can only be used with the nozzle 3 mounted on the cylinder head 1 vertically. In use, the nozzle 3 passes through the central hole of the cylinder head 1 with the air flow guide surface 6 protruded from the bottom of the cylinder head 1.

Figure 4:
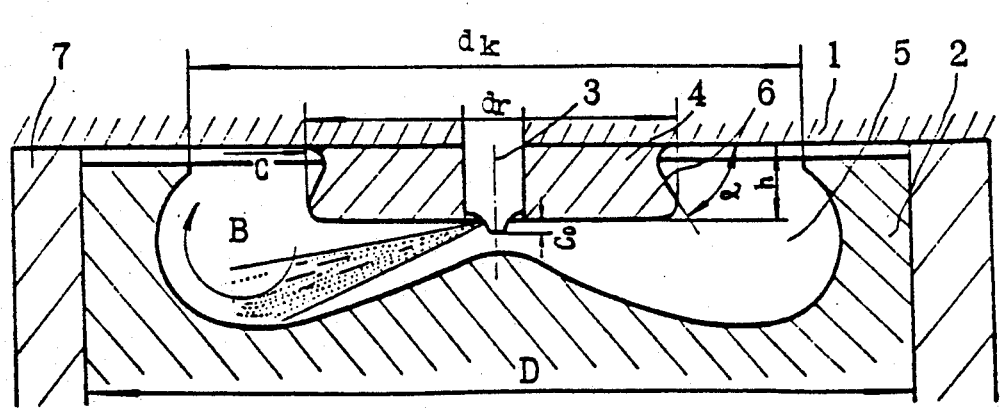
FIG. 4 is a sectional view of the combustion chamber assembly of the invention with the air flow guide ring in it.

The embodiment shown in FIG. 4 indicates the air flow guide ring used in two stroke loop scavenging Diesel engine, in which there is no limitation by gas valves as located on the cylinder head of four stroke Diesel engines. The size of air flow guide ring can be made larger, or an air flow guide ring can be casted with larger diameter on the bottom surface of cylinder head.

When the fuel spray injected from nozzle meets the air flow B, coming from the lower end of air flow guide ring under the guidance of guiding surface, it runs out with air flow B and forms an eddy swirl movement which further improves the mixing of air and fuel.

The structure of air flow guide ring shown in FIG. 4 is basically same as that shown in FIG. 1, but is is larger in ring size, which is shown in the following:

$$d_k = (0.7-0.8)D$$

$$d_r = (0.4-0.6)D$$

$$h = (0.03-0.05)D$$

and $$d_r/d_k = 0.5-0.6$$

in which,
D is the diameter of piston,
$d_k$ is the throat diameter of the piston top combustion chamber,
$d_r$ is the diameter of the air flow guide ring,
h is the thickness of the air flow guide ring.

The another advantage of the embodiment shown in FIG. 4 is that the diameter of air flow guide ring $d_r$ is also larger due to throat diameter $d_k$ of piston top combustion chamber being larger. For this reason, when the air flow guide ring goes into the throat during piston moving toward TDC, the air passage area $\pi/4(d_k^2 - d_r^2)$ will be greatly reduced and the squish air flow velocity will be increased. Under the other conditions during piston moving, the squish air velocity becomes much weaker and also air flow loss becomes smaller. The embodiment shown in FIG. 4 is also adapted to the four stroke diesel engine with larger diameter.

It can be noticed from the above description that the construction of this invented air flow guide ring is simple, easy to be used. When the air flow guide ring applied to any present D.I. diesel engines, it is not necessary to change any parts except that the protrusion distance of nozzle into the combustion chamber and the injection timing angle need a little regulation. After the application of the air flow guide ring, it gives distinct effect on the reduction of exhaust temperature and maximum combustion pressure, the improvement of smoke and considerable fuel economy. For example: In the test of 6102AQ high speed diesel engine with square shape combustion chamber made by Chao-Yang Diesel Machine Factory, the following data is shown. The fuel consumption at the point of nominal power and maximum torque are both reduced with an amount 4.5 g/Hp-hr, and the improvement of smoke, exhaust temperature and maximum combustion pressure is also obtained.

While the present invention has been described above in relation to preferred embodiments, it should appreciated that the invention is not limited to such embodiments, but various changes in design can be adopted without departing from the spirit of the invention.

I claim:

1. Combustion chamber assembly of direct injection diesel engine, comprising a cylinder head, a cylinder liner, an injection nozzle and a piston having a combustion chamber on its top wherein:
   an air flow guide ring is provided in the combustion chamber assembly, said guide ring is arranged under and adjacent to the bottom surface of said cylinder head, and around said nozzle,
   the peripheral surface of said guide ring acts as an air flow guide surface to lead the moving direction of air squish, said air flow guide surface inclines in relation to the bottom surface of said cylinder head and its inclination angle is in the range of 30-70 degrees.

2. Combustion chamber assembly as claimed in claim 1, wherein said inclination angle is in the range of 40-60 degrees.

3. Combustion chamber assembly as claimed in claim 1, wherein when used in four stroke Diesel engine with cylinder diameter less than 150 mm, said air flow guide ring has its diameter $d_r = 16-22$ mm, and thickness $h = 3-3.5$ mm.

4. Combustion chamber assembly as claimed in claim 1, wherein the ratio between the diameter $d_r$ of said air flow guide ring and the diameter $d_k$ of the throat opening of said combustion chamber at the top of the piston is $d_r/d_k = 0.5-0.6$.

5. Combustion chamber assembly as claimed in claim 1, wherein said air flow guide ring is integral with said injection nozzle and said air flow guide surface is formed on the peripheral surface of the front portion of said nozzle.

6. Combustion chamber assembly as claimed in claim 5, wherein the diameter $d_r$ of said air flow guide ring is same as the diameter d of said nozzle.

* * * * *